Figure 1:
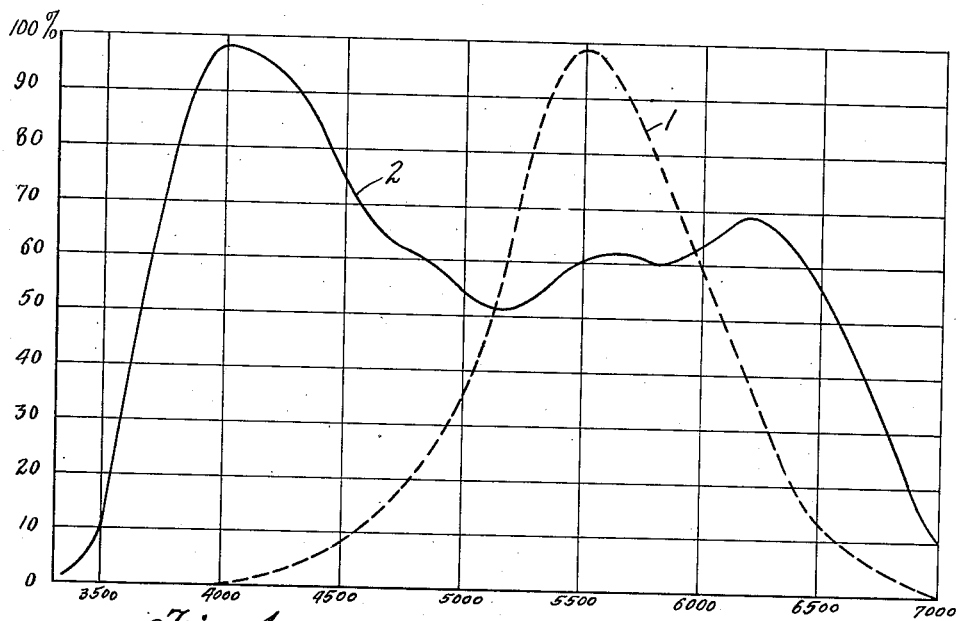

Nov. 16, 1937.  M. FIRESTEIN ET AL  2,099,010

PHOTOGRAPHIC MAKE-UP

Filed June 8, 1936

INVENTORS
Max Firestein
Steven Ferentzy
BY Lyon & Lyon
ATTORNEYS

Patented Nov. 16, 1937

2,099,010

UNITED STATES PATENT OFFICE 2,099,010

PHOTOGRAPHIC MAKE-UP

Max Firestein, Beverly Hills, and Steven Ferentzy, Los Angeles, Calif., assignors to Max Factor & Co., Los Angeles, Calif., a corporation of Delaware Application June 8, 1936, Serial No. 84,068

11 Claims. (Cl. 167—91)

This invention relates to the art of producing cosmetics such as foundation creams, face powders, etc., particularly designed for use in photography. Moreover, the invention relates to cosmetics which permit the photography of subjects on panchromatic film or on a plurality of films simultaneously for the production of photographic images of different color value, which images are subsequently used in forming colored reproductions.

In the art of color photography as, for example, where a motion picture is to be reproduced in colors by any of the well known systems such as the imbibition, dye-toning, subtractive and/or additive processes, difficulty has been encountered in obtaining realistic representations of flesh tones. The images of actors and actresses appear extremely flat so that facial expression is practically lost and the actors and actresses appear to wear masks which are relatively lifeless. This highly undesirable effect is apparently due to a number of causes and particularly to the fact that the panchromatic emulsions ordinarily employed in color photography are not sensitive to the various portions of the spectrum to the same extent that the eye is sensitive to similar portions of the spectrum.

The present invention correlates the sensitivity of normal panchromatic films usually employed in color photography (and in monochromatic photography to some extent) with the light reflective characteristics of the cosmetic employed by the actors so that the resulting images are capable of producing substantially the same effect that the human eye records in viewing the actors directly.

Heretofore it has been recognized that cosmetics such as foundation creams, complexion powders and the like, for use by actors being photographed, should differ in characteristics from those employed by women for ordinary street wear, but no definite teachings as to the necessary or desirable characteristics of such theatrical powders have been enunciated. As a result, the preparation and compounding of cosmetics for theatrical use has been in accordance with rule of thumb methods which resulted in the production of cosmetics varying so greatly from batch to batch that no stability of results and no assurance of uniformity existed. The present invention is directed toward an accurate and definite method whereby the sensitivity characteristics of a motion picture film or other photographic medium may be correlated with the desired results so that the production of a cosmetic having the required characteristics is assured.

An object of the present invention, therefore is to disclose and provide a method whereby the production of cosmetics particularly adapted for theatrical and motion picture use may be readily and accurately attained.

Another object of the invention is to disclose and provide cosmetic preparations particularly adapted for use by actors and actresses whose images are to be recorded on panchromatic film.

A still further object is to disclose and provide methods of correlating the sensitivity characteristics of motion picture film with light-reflective characteristics of cosmetics whereby natural, lifelike color values may be recorded upon the film.

These and other objects, uses, advantages and modifications of the invention will become apparent to those skilled in the art from the following detailed description of a preferred method of compounding cosmetic preparations coming within the scope of this invention and by correlating the spectra characteristics of photographic emulsions with the light-reflective characteristics of cosmetics.

In describing the invention, reference will be had to the appended graphs, in which:

Fig. 1 graphically indicates the relationship between sensitivity of the human eye to various portions of the spectrum and the sensitivity of a panchromatic emulsion to sunlight.

Figure 2:
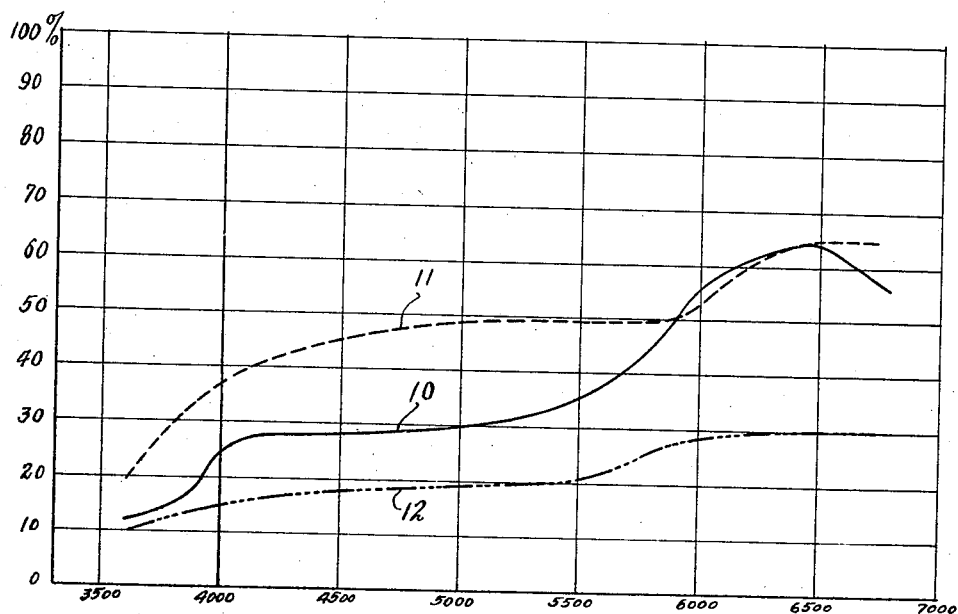

Fig. 2 is a comparative graph indicating the relative color reflection coefficients of an ordinary make-up and of two make-ups or cosmetics prepared in accordance with this invention.

One of the reasons why photographic images of actors and actresses do not correlate the flesh tones is due to the fact that the human eye is normally more sensitive to the green portions of the spectrum than to other portions of the spectrum. As indicated in Fig. 1, for example, the curve 1 represents the sensitivity of the human eye to various portions of the spectrum and it appears that the eye is most sensitive to portions of the spectrum having a wave length of around 5500 Angstrom units. At the threshold of vision, that is when the luminosity is barely perceptible, the eye appears to be most sensitive to portions of the spectrum in the neighborhood of 5000 Angstrom units.

On the average, therefore, it appears that green tones or portions of the spectrum lying between 5000 and 5500 Å. record most readily in the human eye. A panchromatic photographic emulsion, however, is most sensitive to the blue and violet portions of the spectrum, that is, to wave lengths of from between 4000 and 5000 Å. Supersensitive panchromatic film of a type commonly employed in the production of both additive and subtractive color processes only exhibits about 80% sensitivity to wave lengths of 5300 Angstrom units in bright sunlight and a sensitivity of only about 60% when the subject is illuminated with a carbon arc of a type most closely approximating sunlight. The human eye, however, is most sensitive to such wave lengths.

In view of the difference between photographic effect and normal sensitivity of the eye, it is necessary for the actors to employ cosmetics which differ radically from those ordinarily employed. By referring to Fig. 2, it will be seen than an ordinary cosmetic, such as that indicated by the curve 10, has a reflection coefficient of about 30% for wave lengths between 4000 and 5500 Angstrom units and is capable of reflecting approximately twice as much light if the light consists of wave lengths between 6000 and 6500 Angstrom units. When an actor wearing such make-up is photographed on panchromatic film either in normal sunlight or under a carbon arc capable of emitting a light approximating the composition of sunlight, an unearthly unnatural photographic effect is obtained. This is principally due to the fact that an insufficient proportion of the shorter wave lengths (4000 to 5000 Å.) are reflected by such cosmetic in proportion to those which are reflected in the orange and red bands of the spectrum. The present invention is based on the discovery just enunciated and such discovery is apparently directly opposed to what would be more readily understood as a logical reason. Even though a normal panchromatic emulsion is most sensitive to the blue and violet portions of the spectrum and is not as sensitive to the orange and red portions of the spectrum, it has been found highly desirable to employ cosmetics which have a higher light reflective coefficient for the blue and violet portions of the spectrum (with respect to the orange and red portions) than is the case with normal cosmetics.

It has been discovered that when a cosmetic is so blended that it has a color reflection coefficient in the orange portion of the spectrum which is not more than 50% greater than the reflection coefficient in the blue portions of the spectrum, such cosmetic may be employed by artists being photographed on panchromatic film with great success, the resulting images being free from the mask-like, lifeless and flat appearance which ordinarily is recorded when the actors wear the cosmetics of the prior art.

Curves 11 and 12 (Fig. 2) represent color reflection coefficients of two cosmetics prepared in accordance with this invention, curve 11 depicting the color reflection coefficients of a cosmetic particularly adapted to represent pale or blond individuals or complexions whereas curve 12 represents the characteristics of a cosmetic particularly adapted to represent the dark, weather-beaten brunette types. It is to be understood that in actual practice various intermediate types or shades of cosmetics may be employed, depending upon the character to be represented or on which the cosmetic is to be employed.

Attention is particularly called to the fact that the cosmetics of this invention have a reflection coefficient in the orange and red portions of the spectrum that is between about 6000 and 6700 Angstrom units, which is not more than 50% greater than the reflection coefficient at 5000 or 5200 Angstrom units. As a result, a higher proportion of incident light is reflected at that portion of the spectrum to which the eye is normally most sensitive than is the case with normal or usual types of cosmetics. A comparison of curves 10 and 11, for example, shows that although both cosmetic preparations have practically identical reflection coefficients in the range 6000–6500 Angstrom units, the cosmetic of this invention has a reflection coefficient of approximately 47.5% at 5000 Angstrom units, whereas the normal or usual cosmetic indicated by the curve 10 has a reflection coefficient of only 30%.

In other words, the cosmetic of this invention has a reflection coefficient of about 160% of that of prior cosmetics in this wave length band. A similar distinction is to be observed in the characteristics of curve 12 since the curve 12 represents a cosmetic which necessarily has an overall low coefficient of reflection (this particular cosmetic being designed to represent dark or brunette types). Such curve 12 also exhibits but a minor drop in reflective powers from the orange band to the blue-green band.

The data submitted herewith and the color reflection coefficients appearing in Fig. 2 were obtained on a special grating spectrograph consisting of a slit assembly, a grating assembly which holds the light dispersing grating, and a camera. This particular type of apparatus has been developed by M. F. Hasler of the California Institute of Technology at Pasadena, California. The mask is placed before the camera opening with a slot which admits light every hundred Angstroms in the spectrum. The camera is also mounted before a rotary sector, this particular type of sector being described in detail in the March, 1936, issue of the Review of Scientific Instruments (Vol. 7, pages 137–139 inclusive). A magnesium oxide surface is employed as a standard, and light from a daylight-type projection lamp is reflected from this surface onto the slit of the spectrograph. In testing cosmetics, the cosmetics are applied to a substance approximating the skin in texture and this coated object then substituted for the magnesium oxide surface. The coefficients of reflection are then calculated from photographs of the spectrum obtained as above described and further details are available in the article noted hereinabove.

In the preparation of cosmetics in accordance with this invention, the pigments employed preferably include white pigments such as titanium oxide and zinc oxide. More accurate control is attained by employing only relatively small quantities of fillers, such as talc, china clay, or the like. Desired light-reflective properties are attained by the utilization of cosmetic pigments such as ivory black, blue lake, red lakes, ochre substitutes, sienna substitutes, umber substitutes, etc. By ochre, sienna and umber substitutes reference is made to those synthetic products which are used in the art in place of natural mined ochre, sienna and umber. The white pigments, such as titanium and zinc oxides, should preferably comprise more than 50% of the solids employed in the cosmetic and in actual practice it has been found that from 50% to 90% of the solids may consist of these white pigments.

The kind and proportion of color pigments and lakes will depend upon the character of cosmetic required. Relatively light cosmetics should contain higher proportions of the white pigments than those cosmetics which are to represent the brunette types. Furthermore, a higher content of red and blue pigments should be present in lighter shades of cosmetics for the purpose of cutting down the reflection coefficients in the orange-red portions and in the violet and ultraviolet portions of the spectrum. Small quantities of non-actinic, light-absorbing pigments such as carbon blacks and ivory blacks, may be used in the brunette types of cosmetics for the purpose of cutting down the over-all light-reflective coefficient.

The following examples define the kind and proportion of pigments employed in the light, highly reflective and the dark types of cosmetics:

|  | Light | Dark |
| --- | --- | --- |
|  | Percent | Percent |
| Titanium oxide | 11.55 | 6.49 |
| Zinc oxide | 41.56 | 22.49 |
| Ochre substitute | 1.76 | 8.02 |
| Blue Lake | 0.385 | 1.28 |
| Red Lake | 0.99 |  |
| Sienna substitute |  | 8.02 |
| Umber substitute |  | 1.63 |
| Ivory black |  | 7.07 |

The pigments defined hereinabove in the illustrative examples are preferably suspended in an oily carrier and in the specific examples the mixture of pigments comprised 55% in terms of the finished cosmetic, the oily base comprising 45%. Mineral oils, vegetable oils and mixtures thereof with or without alcohols, wetting agents and the like may be employed in the carriers. The preparations thus made are particularly adapted for use by actors and actresses as a foundation liquid of non-drying, non-caking character. The reflection coefficients shown as curves 11 and 12 represent the reflection characteristics of these two "Light" and "Dark" examples.

It will be apparent to those skilled in the art that the type and proportion of the various pigments may be materially varied, depending upon the specific use to which the cosmetic is directed. The teachings of this invention are applicable not only to the preparation of foundation creams but are also adaptable to the formation of various powders.

The teachings hereinabove expressed may be also stated as follows:

The cosmetics, foundation creams, powders or the like made in accordance with this invention should have a relatively high light-reflective coefficient in the red portion of the spectrum, say in the neighborhood of 6500 Angstrom units, the reflection coefficient decreasing gradually toward the shorter wave lengths. If the reflection coefficients of various spectra shorter in wave length than 6500 are expressed in terms of the maximum reflection coefficient at 6500, then substantially all of the cosmetics coming within the scope of the present invention will fall within the following ranges of reflectivity at the wave lengths indicated:

| Wave length | Percentage of reflectivity |
| --- | --- |
|  | Percent |
| 6500 | 100 |
| 6000 | 80-95 |
| 5500 | 70-85 |
| 5000 | 60-80 |
| 4500 | 55-75 |
| 4000 | 45-65 |
| 3600 | 25-40 |

In other words, a cosmetic made in accordance with this invention will have a reflectivity coefficient in the 5000 Angstrom unit band which is 60%-80% of the maximum coefficient of reflection at 6500. Similarly, at or about the 4000 Angstrom unit band of the spectrum the reflection coefficient of the cosmetic should be between 45% and 65% of the maximum coefficient of reflection at 6500. Within these ranges both the light or blond types and brunette types of make-ups coming within the scope of the invention are embraced.

In interpreting the light-reflection coefficients, it is to be understood that in the event light-reflection characteristics are determined every hundred Angstrom units, a much more irregular curve than that shown in Fig. 2 may be obtained. The curves shown in Fig. 2 have been smoothed out so as to eliminate minor variations from the mean. Attention is called to the fact that in the products of this invention, each of the products has a maximum coefficient of reflection to wave lengths within the range 6200 to 6500 Å., the reflection coefficient to shorter wave lengths being lower than to wave lengths within such range. By the regulated addition of the white pigments, however, the reflection coefficient to these shorter wave lengths, and particularly to wave lengths within the range 4000-4500 Å., is maintained at a relatively high ratio so that the reflection coefficient to said shorter wave lengths is about 45% to 75% of said virtually maximum coefficient of reflection. For example, if it is assumed that product 11 has a maximum reflection coefficient within the range 6000-6500 Å., of 62%, then it will be seen that the reflection coefficient of 42% within the range 4000-4500 Å. is about 67.7% of the maximum. In product 12, the maximum reflection coefficient is 30% whereas the reflection coefficient within the range 4000-4500 Å. is about 17.5%. The reflection coefficient in this lower band, therefore, is 58% of the maximum reflection coefficient of the product shown in curve 12.

We claim:

1. A cosmetic adapted for use on humans to be photographed on panchromatic type emulsions, the cosmetic containing white and colored pigments in quantity and proportion sufficient to impart to said cosmetic a maximum light-reflecting characteristic in the neighborhood of the 6500 Angstrom unit band of the spectrum, and a light-reflective characteristic of between 70% and 85% of such maximum in the neighborhood of the 5500 Angstrom unit band, a light-reflective characteristic of between 55% and 75% in the neighborhood of the 4500 Angstrom unit band, and a light-reflective characteristic of between 25% and 40% of such maximum in the neighborhood of the 3600 Angstrom unit band of the spectrum.

2. A cosmetic preparation of the character described and adapted for use on humans to be photographed on panchromatic type emulsions; said cosmetic containing white and colored pigments in quantity and proportion sufficient to impart to said cosmetic a high reflection coefficient to wave lengths of about 6200 to 6500 Å. and lower coefficients to shorter wave lengths of light, the reflection coefficient to wave lengths within the range 4000 to 4500 Å. being 45% to 75% of the reflection coefficient to wave lengths within the range 6200 to 6500 Å.

3. A cosmetic preparation adapted for use on humans to be photographed on panchromatic type emulsions; said cosmetic being composed of colored and uncolored pigments and fillers in a carrier, more than about 50% of the total solids in said cosmetic consisting of white pigments of the type of zinc oxide and titanium oxide, said cosmetic containing said colored and uncolored pigments and fillers in proportions sufficient to impart to said cosmetic a high reflection to efficient to wave lengths within the range 6200 to 6500 Å. and lower reflection coefficients to shorter wave lengths of light, the reflection coefficient to wave lengths of about 4000 Å. being about 45% to 65% of the reflection coefficient to wave lengths within the range 6200 to 6500 Å.

4. In a method of compounding cosmetics adapted for use on humans to be photographed on emulsions of panchromatic type, the steps of regulating the reflectivity of the cosmetic to light of wave lengths shorter than about 5500 Å. by incorporating in said cosmetic pigments from the group consisting of zinc oxide and titanium oxide in amount sufficient to constitute from about 50% to 90% of total insoluble solids in said cosmetic, the quantity of white pigments so incorporated being adapted to increase the reflectivity of the cosmetic to wave lengths within the range of 4000 to 4500 Å. to a value of about 45% to 75% of the reflectivity of said cosmetic to wave lengths within the range 6200 to 6500 Å., the maximum reflectivity of said cosmetic being to wave lengths within said 6200–6500 Å. range.

5. A method of compounding cosmetics whereby realistic effects are obtained when cosmetics are applied to humans and the latter photographed which comprises blending 50% to 90% of substantially white pigments with 10% to 50% of colored pigments in proportions within said range sufficient to form a cosmetic having a virtual maximum reflection coefficient to wave lengths within the range 6200 to 6500 Å. and a reflection coefficient to wave lengths of 4000 to 4500 Å. of about 45% to 75% of said maximum reflection coefficient.

6. In a method of compounding cosmetics, the steps of incorporating and blending substantially white pigments with colored pigments to form a cosmetic having a virtual maximum reflectivity to long wave lengths within the range 6200–6500 Å. and lower reflectivity to shorter wave lengths, the white pigments comprising 50% to 90% of the total solids whereby the reflectivity of the cosmetic to wave lengths within the range 4000 to 4500 Å. is increased to about 45%–75% of the reflectivity of said cosmetic to wave lengths within the range 6200–6500 Å. and reducing the overall reflectivity of the cosmetic by incorporating a carbon black therein.

7. A cosmetic preparation of the character described and adapted for use on humans to be photographed on panchromatic type emulsions, said cosmetic containing white and colored pigments, the white pigments comprising from about 50% to 90% of the total solids present, said cosmetic varying in reflection coefficients in a predetermined manner with respect to short and long wave lengths of the spectrum, said white pigments being blended with said colored pigments within the range 50%–90% so as to form a cosmetic having a virtual maximum reflection coefficient to wave lengths within the range 6200–6500 Å., and a reflection coefficient to wave lengths of 4000 to 4500 Å. of about 45% to 75% of said maximum reflection coefficient.

8. A cosmetic preparation of the character described and adapted for use on humans to be photographed on panchromatic type emulsions, said cosmetic containing white and colored pigments, the white pigments in said cosmetic comprising from about 50% to 90% of the total solids present, said cosmetic having a virtual maximum reflection coefficient to wave lengths within the range 6200–6500 Å. and having lower reflection coefficients to shorter wave lengths of light, said white and colored pigments being blended within the range stated in quantity and proportion sufficient to impart to said cosmetic a reflection coefficient to wave lengths of about 4500 Å. of about 55% to 75% of said maximum reflection coefficient.

9. A cosmetic preparation of the character described and adapted for use on humans to be photographed on panchromatic type emulsions, said cosmetic containing white and colored pigments, the white pigments in said cosmetic comprising from about 50% to 90% of the total solids present, said cosmetic having a virtual maximum reflection coefficient to wave lengths within the range 6200–6500 Å. and having lower reflection coefficients to shorter wave lengths of light, said white and colored pigments being blended within the range stated in quantity and proportion sufficient to impart to said cosmetic a reflection coefficient to wave lengths of about 4000 Å. of about 45% to 65% of said maximum reflection coefficient.

10. A cosmetic preparation of the character described and adapted for use on humans to be photographed on panchromatic type emulsions, said cosmetic comprising white and colored pigments, the white pigments comprising from about 50% to 90% of the total solids present, said cosmetic having a virtual maximum reflection coefficient to wave lengths within the range 6200–6500 Å. and lower reflection coefficients to shorter wave lengths of light, said colored and white pigments within the range stated being blended in proportions sufficient to impart to said cosmetic a reflection coefficient to wave lengths of about 4500 Å. of about 55% to 75% of said virtual maximum coefficient and a reflection coefficient to wave lengths of about 4000 Å. of about 45% to 65% of said maximum reflection coefficient.

11. A cosmetic preparation of the character described and adapted for use on humans to be photographed on panchromatic type emulsions, said cosmetic preparation containing white and colored pigments, said cosmetic having a virtual maximum reflection coefficient to wave lengths within the range 6200–6500 Å. and having lower reflection coefficients to shorter wave lengths of light, said cosmetic having a total reflection coefficient of between 30% and 65% to wave lengths within the range 6000–6500 Å. and a reflection coefficient of between about 18% and 45% of the total to wave lengths of about 4500 Å., the reflection of said cosmetic to wave lengths of about 4500 Å. being 55 to 75% of the maximum reflection coefficient of said cosmetic within the long wave length range specified.

MAX FIRESTEIN.
STEVEN FERENTZY.